Nov. 13, 1928. E. E. BALDWIN Re. 17,129

MARCEL HAIR WAVER

Original Filed May 13, 1926

Inventor

E. E. Baldwin

By A. Kaufmann Jr. Attorney

Reissued Nov. 13, 1928. Re. 17,129

UNITED STATES PATENT OFFICE.

ELNORA E. BALDWIN, OF DENVER, COLORADO.

MARCEL HAIR WAVER.

Original No. 1,627,590, dated May 10, 1927, Serial No 108,901, filed May 13, 1926. Application for reissue filed April 30, 1928. Serial No. 274,082

This invention relates to hair wavers, and has for one of its objects the provision of a novel, simple and inexpensive device of this character through the medium of which Marcel waves may be made in the hair in a comparatively short time and without the aid of heat.

Figure 1:
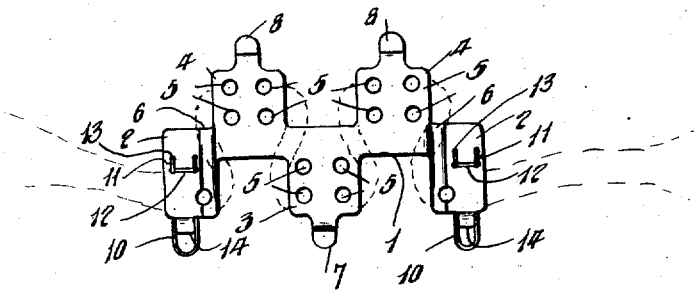
Figure 2:
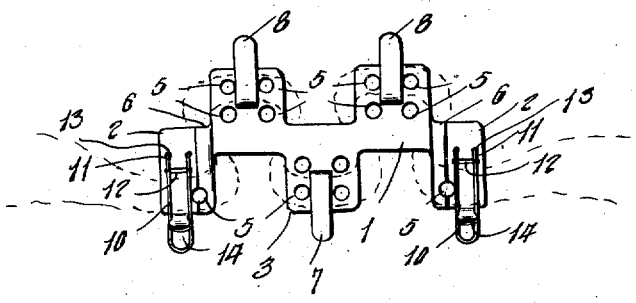
Figure 3:
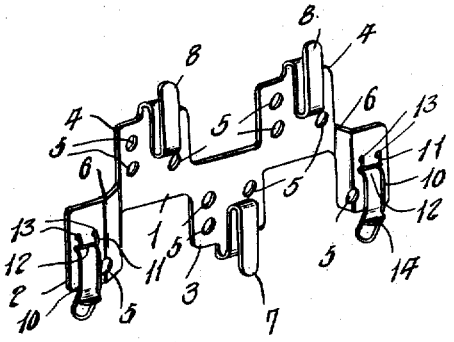
Figure 4:
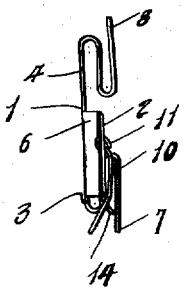

With the foregoing and other objects in view, the nature of which will appear as the description proceeds, the invention consists of the construction, combination and arrangement of parts hereinafter fully described and claimed, and illustrated in the accompanying drawing, wherein:

Figure 1 is an elevational view of a hair waver constructed in accordance with my invention, Figure 2 is a similar view of the hair waver looking at the opposite side thereof, Figure 3 is a perspective view of the hair waver, and Figure 4 is a view in end elevation of the hair waver.

Corresponding and like parts are referred to in the following description, and designated in the several views of the accompanying drawing, by similar reference characters.

The hair waver is preferably made of light sheet metal suitably treated to prevent corrosion thereof. It comprises a central portion or bar 1, terminal arms 2 extending from one longitudinal edge of the bar, an intermediate arm 3 extending from said edge of the bar, and arms 4 extending from the other longitudinal edge of the bar. The arm 3 is located centrally between the arms 2, and the arms 4 are spaced apart for a distance equal to the width of the arm 3. The arms 2, 3 and 4 are perforated as shown at 5 to permit air to circulate freely therethrough. The bar 1 is offset as at 6 to position the arms 2 in spaced parallel relation to the arms 3 and 4. The arm 3 is provided with a hook 7 and the arms 4 with hooks 8. The hooks 7 and 8 are resilient and of less width than and formed integrally with the arms 3 and 4, and located at that side of the bar 1 beyond which the offset portions 6 extend. The hooks 7 and 8 are of substantially U-form and their open ends are located at the outer edges of the arms 3 and 4. The inner members of the hooks 7 and 8 are located in the plane of the arms 2, and the free ends of the outer members of the hooks project beyond the outer edges of the arms 3 and 4 to facilitate the insertion of the hair into the hooks. Clasps 10 made of wire treated to prevent their corrosion and of substantially U-form, have their terminals looped as shown at 11 to engage slots 12 and openings 13 in the arms 2 whereby to pivotally connect the clasps to said arms. The clasps 10 extend along those sides of the arms 2 corresponding to the sides of the arms 3 and 4 opposite which the hooks 7 and 8 are located, and extend beyond the outer edges of the arms 2 and have their extended portions curved as shown. Said edges of the arms 2 are provided with shouldered retaining lugs 14 with which the clasps are releasably engaged to hold them in hair retaining position. The lugs 14 have an angular relation to the arms 2 and extend from said arms angularly in a direction opposite to the angular extension of the free ends of the clasps 10 with respect to said arms, whereby to permit the clasps to be readily engaged with or disengaged from the lugs.

In practice, several of the devices are used in making Marcel waves in the hair of a single person. The hair is moistened and thereafter locks thereof are twisted about the rod 1 and arms 2, 3 and 4 and engaged with the hooks 7 and 8 in the manner suggested in Figures 1 and 2. The clasps 10 are thence swung into engagement with the lugs 14 and those portions of the lock of hair contacting with the arms 2, whereby to prevent the devices from having any casual movement with respect to the lock of hair. As soon as the hair dries, the devices may be removed, and on their removal it will be found that Marcel waves of substantial permanence have been made in the hair. Due to the openings 5 and the arms 2, 3 and 4, those portions of the locks of hair in contact with the arms will rapidly dry. The device may be made in different sizes, that is it may be made of any desired length and width, the longer the device the greater the number of arms 3 and 4 and hooks 7 and 8 it will be provided with.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

Having described my invention what is claimed as new is:

1. A hair waver comprising a body member having a plurality of arms en masse extending outwardly on opposite sides thereof and spaced apart, the arms intermediate the extremities of the device being each provided with a plurality of distinct relatively small perforations formed in the masse material of the arms to facilitate the drying of the hair when the device is applied.

2. A hair waver comprising a bar, arms entending in one direction from the bar, other arms extending in the opposite direction from the bar, resilient hooks carried by certain of said arms, and clasps carried by the remaining arms.

3. A hair waver comprising a bar, arms extending in one direction from the bar, other arms extending in the opposite direction from the bar, resilient hooks carried by and extending beyond the outer edges of certain of said arms, and clasps carried by the remaining arms.

4. A hair waver comprising a bar, arms extending in one direction from the bar, other arms extending in the opposite direction from the bar, hooks carried by certain of the arms, shouldered lugs carried by the remaining arms, and clasps pivoted to the remaining arms and releasably engaged with the lugs.

5. A hair waver comprising a bar having offset end portions, arms extending from said offset portions, clasps carried by said arms, other arms extending from intermediate portions of the bar, and hooks carried by the other arms.

6. A hair waver comprising a bar having offset end portions, arms extending in one direction from said offset portions and terminally provided with shouldered lugs, clasps pivoted to the arms and releasably engaged with said lugs, an arm extending from an intermediate portion of the bar in the direction of the extension of the first named arms, a hook carried by said last named arms, other arms extending in the opposite direction from the bar and occupying planes passing between the first named arms, and hooks carried by the other arms.

7. A hair waver comprising a flat bar, flat arms extending in one direction from the bar, other flat arms extending in the opposite direction from the bar, said arms being provided with perforations, hooks carried by certain of said arms, and clasps carried by the remaining arms.

8. A hair waver comprising a bar having offset end portions, arms extending from said offset portions, clasps carried by said arms, and other arms extending from intermediate portions of the first bar.

In testimony whereof I affix my signature.

ELNORA E. BALDWIN.